US012716649B2

(12) United States Patent
Repasky

(10) Patent No.: US 12,716,649 B2
(45) Date of Patent: Aug. 25, 2026

(54) REFRIGERATION-INTEGRATED HYDROCARBON COLLECTION SYSTEM AND METHOD OF OPERATION

(71) Applicant: Oxy Low Carbon Ventures, LLC, Houston, TX (US)

(72) Inventor: John M. Repasky, New Braunfels, TX (US)

(73) Assignee: Oxy Low Carbon Ventures, LLC, Houston, TX (US)

( * ) Notice: Subject to any disclaimer, the term of this patent is extended or adjusted under 35 U.S.C. 154(b) by 436 days.

(21) Appl. No.: 17/799,025

(22) PCT Filed: Feb. 11, 2021

(86) PCT No.: PCT/US2021/017560
§ 371 (c)(1),
(2) Date: Aug. 11, 2022

(87) PCT Pub. No.: WO2021/163257
PCT Pub. Date: Aug. 19, 2021

(65) Prior Publication Data

US 2023/0066063 A1 Mar. 2, 2023

Related U.S. Application Data

(60) Provisional application No. 62/972,949, filed on Feb. 11, 2020.

(51) Int. Cl.
*F25J 1/02* (2006.01)
*C09K 8/594* (2006.01)
(Continued)

(52) U.S. Cl.
CPC ............. *F25J 1/0228* (2013.01); *C09K 8/594* (2013.01); *C10L 3/12* (2013.01); *E21B 21/067* (2013.01);
(Continued)

(58) Field of Classification Search
CPC ........ F25J 1/0228; F25J 1/0022; F25J 1/0072; F25J 1/0075; F25J 1/0221; F25J 1/0234;
(Continued)

(56) References Cited

U.S. PATENT DOCUMENTS

| | | | | |
|---|---|---|---|---|
| 3,400,547 | A * | 9/1968 | Williams | F25J 1/0204 62/50.1 |
| 3,878,689 | A | 4/1975 | Grenci | |
| 2002/0157833 | A1* | 10/2002 | Wilson | E21B 15/02 166/344 |
| 2005/0211440 | A1* | 9/2005 | Lanfermeijer | F25J 3/04987 166/352 |

(Continued)

OTHER PUBLICATIONS

International Search Report and Written Opinion for corresponding PCT/US2021/017560 dated Jul. 16, 2021 (16 pps).

*Primary Examiner* — Joel M Attey
*Assistant Examiner* — Ibrahim A. Michael Adeniji
(74) *Attorney, Agent, or Firm* — Renner, Kenner; Arthur M. Reginelli

(57) ABSTRACT

A method for recovering associated gaseous hydrocarbons from a well for producing liquid hydrocarbons, the method comprising (i) providing gaseous hydrocarbons from a hydrocarbon well; (ii) providing a cryogenic liquid from an air separation unit or an associated nitrogen liquefaction facility within proximity of the hydrocarbon well; (iii) liquefying the gaseous hydrocarbons at a hydrocarbon liquefaction facility within proximity to the hydrocarbon well to thereby produce a liquefied hydrocarbon gas, where heat associated with the gaseous hydrocarbons is transferred to the cryogenic liquid; and (iv) transferring the liquefied hydrocarbon gas to an air separation unit or nitrogen liquefaction facility.

23 Claims, 1 Drawing Sheet

(51) Int. Cl.

| | |
|---|---|
| ***C10L 3/12*** | (2006.01) |
| ***E21B 21/06*** | (2006.01) |
| ***E21B 43/16*** | (2006.01) |
| ***E21B 43/34*** | (2006.01) |
| ***F25J 1/00*** | (2006.01) |

(52) U.S. Cl.
CPC ............ *E21B 43/164* (2013.01); *E21B 43/34* (2013.01); *F25J 1/0022* (2013.01); *F25J 1/0072* (2013.01); *F25J 1/0075* (2013.01); *F25J 1/0221* (2013.01); *F25J 1/0234* (2013.01); *F25J 1/0235* (2013.01); *C10L 2290/06* (2013.01); *C10L 2290/567* (2013.01); *F25J 2210/60* (2013.01)

(58) Field of Classification Search
CPC ...... F25J 1/0235; F25J 2210/60; F25J 1/0015; F25J 2210/42; F25J 1/0223; F25J 3/04224; F25J 3/04266; F25J 3/04533; F25J 2260/44; F25J 2260/80; F25J 3/04563; C09K 8/594; C09K 8/58; C10L 3/12; C10L 2290/06; C10L 2290/567; E21B 21/067; E21B 43/164; E21B 43/34
See application file for complete search history.

(56) References Cited

U.S. PATENT DOCUMENTS

2008/0141672 A1* 6/2008 Shah ........................ C10J 3/466
423/220
2010/0251763 A1* 10/2010 Audun ................... F25J 1/0221
62/614
2011/0126451 A1 6/2011 Pan et al.
2011/0179799 A1* 7/2011 Allam .................. F25J 3/04618
110/297
2012/0199000 A1* 8/2012 Elms .................. B01D 19/0057
96/204
2012/0227978 A1* 9/2012 Fossli ................... E21B 21/001
166/363
2014/0223909 A1* 8/2014 Kuczynski ........... F25J 3/04836
110/297
2014/0260337 A1* 9/2014 Mohammadi .......... F25J 1/0229
62/47.1
2014/0352353 A1* 12/2014 Wissolik ................ F25J 1/0072
62/611
2017/0167785 A1* 6/2017 Pierre, Jr. .............. F25J 1/0234
2017/0167787 A1* 6/2017 Pierre, Jr. .............. F25J 1/0277
2018/0094550 A1* 4/2018 Conlon ................... F01K 23/18
2018/0305274 A1* 10/2018 Rafique .................. B01J 8/0278
2019/0072324 A1* 3/2019 Kim ....................... F25J 3/0266

* cited by examiner

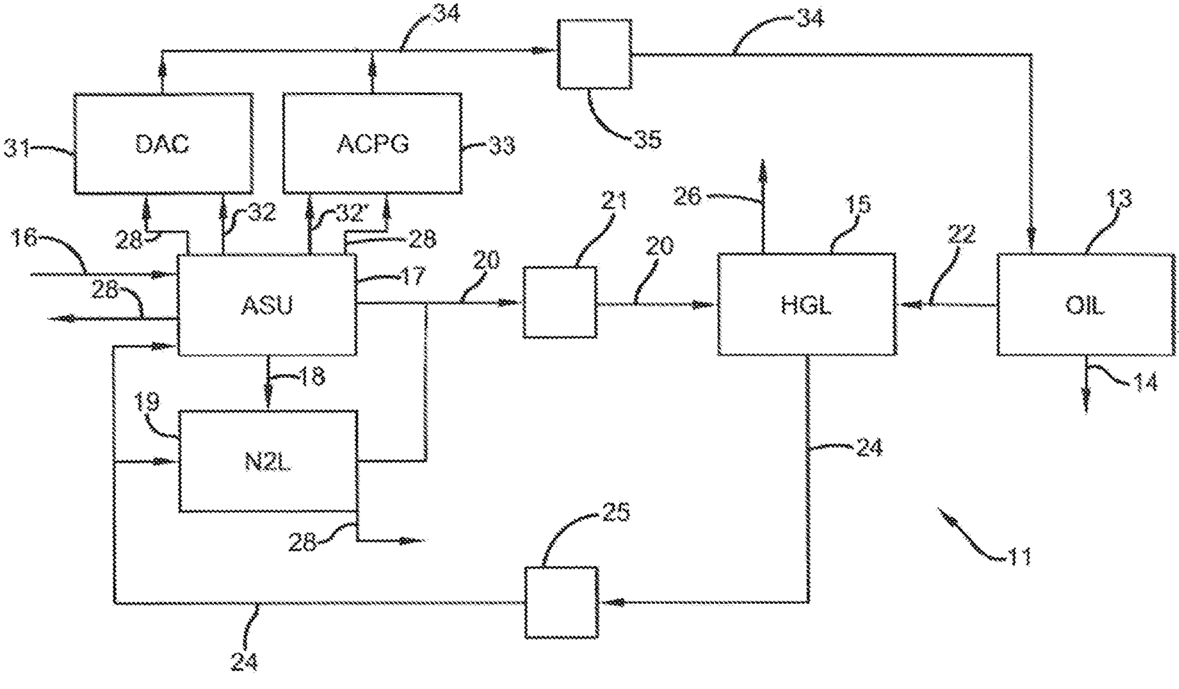
34
34
35
DAC
31
ACPG
33
21
26
15
13
28
32
32'
28
16
28
HGL
OIL
ASU
17
20
20
22
14
18
19
N2L
24
25
28
11
24

REFRIGERATION-INTEGRATED HYDROCARBON COLLECTION SYSTEM AND METHOD OF OPERATION

This application is a national-stage application of PCT/US2021/017560 filed on Feb. 11, 2021, which claims the benefit of U.S. provisional application No. 62/972,949 filed on Feb. 11, 2020, which are incorporated herein by reference.

FIELD OF THE INVENTION

Embodiments of the present invention provide methods and associated systems for the condensation of associated gases at or near a well site by cryogenic liquid-assisted liquefaction, and the subsequent use of those liquefied gases.

BACKGROUND OF THE INVENTION

Gas and oil extraction, which collectively can also be referred to as hydrocarbon production, extracts gas and liquid hydrocarbons from subsurface geologic reservoirs. In certain situations, such as where liquid hydrocarbons are the targeted resource, lighter hydrocarbons, which are extracted with the targeted resource, present challenges. Namely, where liquid petroleum is targeted, natural gas (i.e. methane) and natural gas liquids (e.g. C2-C5 hydrocarbons, or equivalently hydrocarbons containing two, three, four, or five carbon atoms) are byproducts of the production process. These byproduct gases are often referred to as associated gases. Although these associated gases have economic value, this value is not easily realized due to handling and transport issues. For example, liquid petroleum fields (i.e. oil fields) typically do not include the infrastructure and equipment required to direct associated gases to useful markets, and the investments associated with this equipment and infrastructure are not economically viable given the volume of the associated gases that are extracted, as well as the short duration in which these associated gases are typically produced from these wells. As a result, associated gases are often combusted in the field, which technique is referred to as flaring.

Given that associated gases have economic value, techniques have been proposed for realizing the economic value associated with these hydrocarbons. For example, liquefaction of these hydrocarbons has been proposed through the use of liquefaction facilities that are generally portable. These liquefaction facilities may include liquid nitrogen-assisted condensation systems and processes. These methods and systems can reduce the size and capital cost of the required liquefaction facility, as well as simplify the overall process. As an example, these systems can operate in the absence of, or with greatly reduced, mechanical refrigeration systems.

While the liquefaction of associated gases, particularly through use of mobile, liquid nitrogen-assisted liquefaction systems, is believed to be a viable solution to otherwise combusting these resources, the availability and proximity of liquid nitrogen to most oil fields presents a technological challenge. For example, liquid nitrogen is typically obtained from air separation units and associated nitrogen liquefaction facilities. These facilities are typically not constructed within proximity to oil fields, and therefore transport of liquid nitrogen from an air separation unit to an oil field presents technical hurdles, as well as economic challenges.

Local uses for liquefied associated gases from the use of mobile, liquid nitrogen-assisted liquefaction systems are often limited or non-existent, and efficient systems for long-distance transport of the liquefied associated gases are often unavailable.

Since the flaring of associated gases is not desirable, viable solutions to realize the economic value of associated gases and thereby reduce or eliminate the disadvantages associated with flaring these hydrocarbons, is desirable.

SUMMARY OF THE INVENTION

One or more embodiments of the present invention provide a method for recovering associated gaseous hydrocarbons from a well for producing liquid hydrocarbons, the method comprising (i) providing gaseous hydrocarbons from a hydrocarbon well; (ii) providing a cryogenic liquid from an air separation unit or an associated nitrogen liquefaction facility within proximity of the hydrocarbon well; (iii) liquefying the gaseous hydrocarbons at a hydrocarbon liquefaction facility within proximity to the hydrocarbon well to thereby produce a liquefied hydrocarbon gas, where heat associated with the gaseous hydrocarbons is transferred to the cryogenic liquid; and (iv) transferring the liquefied hydrocarbon gas to an air separation unit or nitrogen liquefaction facility.

Yet other embodiments of the present invention provide an integrated system comprising (i) an oil field including one or more wells; (ii) a hydrocarbon gas liquefaction facility integrated with said oil field; (iii) at least one of an air separation unit and a nitrogen liquefaction facility, where said at least one of an air separation unit and a nitrogen liquefaction facility is integrated with said hydrocarbon gas liquefaction facility; and (iv) at least one of a direct air carbon capture facility and an oxygen-fueled combustion facility, where said at least one of a direct air carbon capture facility and an oxygen-fueled combustion facility is integrated with said at least one of an air separation unit and a nitrogen liquefaction facility.

Still other embodiments of the present invention provide a system for the recovery of associated gaseous hydrocarbons, the system including (i) at least one of an air separation unit and a nitrogen liquefier for the production of cryogenic liquid; (ii) at least one liquid hydrocarbon production well; (iii) a hydrocarbon liquefaction facility for the liquefaction of associated gases from the production of liquid hydrocarbons from said at least one liquid hydrocarbon production well; (iv) a liquid nitrogen mobile storage tank and delivery system for the transportation of said cryogenic liquid from said at least one of an air separation unit and a nitrogen liquefier for the production of cryogenic liquid to said hydrocarbon liquefaction facility for the liquefaction of associated gases from the production of liquid hydrocarbon from at least one liquid hydrocarbon production well; and (v) a liquefied gaseous hydrocarbon mobile storage tank and delivery system for the transportation of said liquefied gaseous hydrocarbons from said hydrocarbon liquefaction facility for the liquefaction of associated gases from the production of liquid hydrocarbon from said at least one liquid hydrocarbon production well to said at least one of a cryogenic air separation unit and a nitrogen liquefier for the production of a cryogenic liquid; wherein at least a portion of the refrigeration duty required to liquefy said associated gases from the production of liquid hydrocarbon from at least one liquid hydrocarbon production well is provided by the vaporization of said cryogenic liquid, and wherein at least a portion of the refrigeration duty required to produce said cryogenic liquid is provided by the vaporization of said liquefied gaseous hydrocarbons.

BRIEF DESCRIPTION OF THE DRAWINGS

The FIGURE is a schematic flow chart showing methods and associated systems of one or more embodiments of the present invention.

DETAILED DESCRIPTION OF ILLUSTRATIVE EMBODIMENTS

Embodiments of the invention are based, at least in part, on the discovery of a process and associated system whereby cryogenic liquids are employed to provide refrigeration for the liquefaction of associated gases. This cryogenic liquid-assisted liquefaction takes place at or near a well site, and the liquefied hydrocarbon gases are in turn used to provide refrigeration for the liquefaction of cryogenic liquids. Advantageously, in one or more embodiments, the cryogenic liquid employed in the cryogenic liquid-assisted liquefaction is supplied by a cryogenic air separation unit or associated nitrogen liquefaction system that is within proximity to the location where the liquefaction of the associated gases takes place. And, the cryogenic liquid-assisted liquefaction of the associated gases advantageously takes place within proximity to a well site that produces the associated gases. As a result, the processes of this invention utilize hydrocarbon-containing gases that would otherwise be combusted as waste (e.g. flared off at or near the well site).

Process and System Overview

Embodiments of the present invention can be described with reference to the Figure, which shows system 11 including hydrocarbon-containing gas liquefaction facility 15, which may also be referred to as HGL facility 15, in proximity to hydrocarbon well 13 (labeled "OIL" in the Figure), which may also be referred to as well 13. HGL facility 15 is also in proximity to air separation unit 17, which may also be referred to as ASU 17, air separation facility 17, or cryogenic air separation unit 17, and/or a nitrogen liquefaction facility 19, which may also be referred to as nitrogen liquefier 19 or N2L 19. In one or more embodiments, N2L 19 is associated with ASU 17.

According to conventional techniques, ASU 17 intakes atmospheric air 16 and can produce a stream of cryogenic liquid. In certain embodiments, ASU 17 provides a stream 20 of at least one of liquid air, liquid oxygen, and liquid nitrogen, which stream may also be referred to as cryogenic liquid stream 20. In other embodiments, ASU 17 provides a stream of nitrogen gas 18 to N2L 19, and this gaseous stream of nitrogen 18 is liquefied within N2L 19 to form cryogenic liquid stream 20 in the form of liquefied nitrogen, which may also be referred to as LIN stream. In either event, cryogenic liquid stream 20 is then transported to HGL facility 15 via transport 21.

In one or more embodiments, HGL facility 15 intakes an associated gas stream 22 from well 13 and provides a liquefied hydrocarbon-containing stream 24, which may also be referred to as LHG stream 24. HGL facility 15 produces LHG stream 24 from associated gas stream 22 by employing cryogenic liquid-assisted liquefaction of associated gas stream 22. In this regard, cryogenic liquid stream 20 is employed in converting associated gas stream 22 to LHG stream 24 within HGL facility 15. During this process, at least a portion of cryogenic liquid stream 20 is converted to vaporized cryogenic liquid stream 26, which can then be vented or otherwise captured for use.

LHG stream 24 is then transported to ASU 17 and/or N2L 19 via transport 25. As indicated above, ASU 17 intakes atmospheric air 16 to produce cryogenic liquid stream 20, or ASU 17 produces gaseous stream 18 that is converted to cryogenic liquid stream 20 (i.e. liquid nitrogen stream 20) within N2L 19. In either event, ASU 17 and N2L 19 employ cooling techniques, and LHG stream 24 can be employed by ASU 17 or N2L 19 for cooling (i.e. at least some of the cooling requirements of ASU 17 or N2L 19 are supplied by at least some of LHG stream 24). During this process, LHG stream 24 is converted to vaporized hydrocarbon stream 28, which can then be used locally or exported, or in certain embodiments, it is flared.

In those embodiments shown in the Figure, LHG stream 24 is directed to the same ASU 17 and/or associated N2L 19 that produced cryogenic liquid stream 20. In other embodiments, LHG stream 24 may be directed to a different ASU and/or associated N2L than produced cryogenic liquid stream 20. Likewise, as shown in the Figure, transport 21 (i.e. transport for cryogenic liquid stream 20) is a different transport from transport 25 (i.e. transport for LHG 24). In other embodiments, LHG stream 24 and cryogenic liquid stream 20 may be transported using the same transport.

HYDROCARBON WELL

As indicated above, hydrocarbon well 13 produces associated gas stream 22, which may also be referred to as a gaseous hydrocarbon-containing gas stream 22. In one or more embodiments, hydrocarbon well 13 refers to one or more wells adapted or designed to directly or indirectly (e.g. injection wells) produce liquid hydrocarbons and/or gaseous hydrocarbons, which may collectively be referred to as hydrocarbons. Where multiple wells are included, these multiple wells may be located in one or more oil fields.

In particular embodiments, hydrocarbon well 13 is a hydrocarbon production well of the type for primarily producing liquid hydrocarbons 14, which may also be referred to as liquid petroleum or oil. Advantageously, practice of the present invention can take place during the drilling phase of the well, during the completion phase of the well, and/or during the production phase of the well. Those skilled in the art appreciate that hydrocarbon wells primarily adapted for the production of liquid hydrocarbons (a.k.a. oil play wells) typically do not include systems (e.g. pipelines) for the transport of gaseous hydrocarbons from the well site and therefore may conventionally include flares or other combustion apparatus for flaring the gaseous hydrocarbons.

Depending on the phase of the well (e.g. drilling or production phase), associated gas stream 22 may derive from different processes or systems of the well. For example, during the drilling phase, associated gas stream 22 may derive from a gas-mud separator or gas-mud separator system designed to separate gaseous products extracted from the well (e.g. methane) from liquids emitted from the well (e.g. drilling fluids). In these embodiments, HGL facility 15 can be a stand-alone facility downstream of the separator systems associated with the well (e.g. gas-mud separators). As suggested herein, HGL facility 15 may nonetheless include pretreatment systems to ensure that associated gas stream 22 is properly conditioned for liquefaction within HGL facility 15.

In other embodiments, such as when liquefaction of the associated gases (e.g. hydrocarbons) takes place during the production phase, associated gas stream 22 may derive from a gas-liquid separator or similar separator systems used to treat the production stream (e.g. production stream is separated into associated gas stream 22 and liquid hydrocarbon stream 14). In these embodiments, HGL facility 15 may be a stand-alone facility downstream of the production separators or separator systems. In other embodiments, HGL facility 15 is integrated into the hydrocarbon production stream separator or separator system. For example, HGL facility 15 may be an internal step of a separator or separation system. In these embodiments, HGL facility 15 may be used to condense or remove hydrocarbons (e.g. liquid natural gases or associated gases) from production streams prior to further treating the stream within a gas-gas separator. Namely, HGL facility 15 may be employed to remove hydrocarbons from gaseous streams that also include carbon dioxide (which production streams are common, and particularly when enhanced oil recovery (EOR) techniques are employed). As those skilled in the art appreciate, carbon dioxide separation can be accomplished by employing several techniques including, for example, distillation, membrane separation, and chemical processing (e.g. amine separation techniques). This carbon dioxide separation, particularly when enhanced oil recovery (EOR) techniques are employed, often takes place within a facility referred to as a gas plant. Skilled artisans understand that typical enhanced oil recovery (EOR) processes include a gas plant for treating the gaseous streams of the hydrocarbon production stream. Namely, these gas plants include one or more gas-gas separators or separator systems, and these separators or systems include a device for removing gaseous hydrocarbons from the stream. According to aspects of this invention, cryogenic liquid stream 20 is employed to assist in the cooling or liquefaction of the associated hydrocarbon gases within this gaseous production stream. Stated another way, in one or more embodiments of the invention, HGL facility 15 is integrated into an enhanced oil recovery (EOR) gas plant.

In view of the foregoing, it should be appreciated that reference to hydrocarbon well 13 includes any associated equipment that may be used or desired at the given phase of the well. Those skilled in the art appreciate the interrelationship between the equipment present and the particular phase of the well. Skilled persons also appreciate the type of equipment that is adapted to separate streams that are extracted from the well into liquid and gaseous components, and/or adapted to separate the various gaseous components into hydrocarbon and non-hydrocarbon streams. Accordingly, in one or more embodiments, gaseous hydrocarbon-containing stream 22 includes a stream that has undergone appropriate separation techniques to separate the gas stream from other constituents of the stream extracted from the well (e.g. production stream). In certain embodiments, hydrocarbon well 13, or its associated equipment, may include separation equipment (for example, an adsorption bed) adapted for removing water, carbon dioxide, or other constituents from the gaseous hydrocarbon-containing stream prior to routing the stream to HGL facility 15. In other embodiments, separation equipment (e.g. for removal of hydrocarbons, water, carbon dioxide, and/or other components) may be provided separately and/or included within HGL facility 15.

In one or more embodiments, gaseous hydrocarbon-containing stream 22 includes methane. In one or more embodiments, gaseous hydrocarbon-containing stream 22 includes at least 80 vol %, in other embodiments at least 90 vol %, and in other embodiments at least 95 vol % methane. In these or other embodiments, gaseous hydrocarbon-containing stream 22 includes C2-C5 hydrocarbons. In one or more embodiments, reference to associated gases includes methane and C2-C5 hydrocarbons. For purposes of this specification, methane is a hydrocarbon.

Hydrocarbon Liquefaction Facility

As suggested above, HGL facility 15 is a cryogenic liquid-assisted liquefaction system wherein cryogenic liquid is vaporized (i.e. boiled), and heat is transferred from gaseous hydrocarbon-containing stream 22 to the cryogenic liquid undergoing vaporization. Stated another way, at least a portion of the heat required to vaporize cryogenic liquid stream 20 is provided from gaseous hydrocarbon-containing gas stream 22, which causes at least a portion of stream 22 to cool and/or condense. As those skilled in the art will appreciate, the transfer of heat can take place within a heat exchanger. This heat transfer, optionally in combination with additional heat transfer and/or changes in pressure (e.g. pressure reduction, compression, and/or liquid pumping), converts at least a portion of gaseous hydrocarbon-containing stream 22 to LHG stream 24. According to embodiments of the present invention, at least a portion of the cooling demands of HGL facility 15 is provided by cryogenic liquid stream 20. In one or more embodiments, at least 50%, in other embodiments at least 80%, in other embodiments at least 90%, and in other embodiments at least 95%, and in other embodiments essentially 100% of the cooling requirements of HGL facility 15 are provided by cryogenic liquid stream 20, which as described herein derives from ASU 17 and/or N2L 19. In particular embodiments, HGL 15 employs a liquid air as at least a portion of cryogenic liquid stream 20, and reference may be made to a liquid air-assisted liquefaction process. In other embodiments, HGL 15 employs liquid oxygen as at least a portion of cryogenic liquid stream 20, and reference may be made to a liquid oxygen-assisted, or a LOX-assisted, liquefaction process. In other embodiments, HGL 15 employs liquid nitrogen as at least a portion of cryogenic liquid stream 20, and reference may be made to a liquid nitrogen-assisted, or a LIN-assisted, liquefaction process.

Vaporization of cryogenic liquid stream 20 within the heat exchanger produces a vaporized cryogenic liquid stream 26. As those skilled in the art will appreciate, where cryogenic liquid stream 20 is liquid air, vaporized cryogenic liquid stream 26 will include gaseous air. Where cryogenic liquid stream 20 is liquid oxygen, vaporized cryogenic liquid stream 26 will include gaseous oxygen. Where cryogenic liquid stream 20 is liquid nitrogen, vaporized cryogenic liquid stream 26 will include gaseous nitrogen. In one or more embodiments, vaporized cryogenic liquid stream 26 is vented to the atmosphere. In other embodiments, vaporized cryogenic liquid stream 26 is exported (e.g. by vehicle tanker or pipeline). In other embodiments, vaporized cryogenic liquid stream 26 is used locally. For example, in particular embodiments, such as where vaporized cryogenic liquid stream 26 is or includes gaseous nitrogen, the gaseous nitrogen can be used to regenerate adsorption beds associated with HGL 15 and/or well 13.

As suggested above, HGL 15 includes a heat exchanger, which may also be referred to as an evaporator. Exemplary heat exchangers include brazed aluminum heat exchangers, which are also referred to as BAHXs, coil-wound exchangers, shell-and-tube exchangers, and stainless steel exchangers. Those skilled in the art will appreciate that heat exchangers are equipped with complementary conduit for delivering the respective streams into the heat exchanger (i.e. cryogenic liquid stream 20 and gaseous hydrocarbon-containing stream 22), as well as appropriate conduit for removing the respective streams from the heat exchanger (i.e. vaporized cryogenic liquid stream 26 and LHG 24).

In one or more embodiments, HGL 15 may include a pre-treatment system for the incoming gaseous hydrocarbon stream (i.e. associated gas stream 22). This may include, for example, a filter system for the removal of particulates. In these or other embodiments, the pre-treatment system may include a device or system for the removal of water or gases such as carbon dioxide. In particular embodiments, the pre-treatment system includes adsorption beds or driers (e.g. molecular sieves for the removal of water or carbon dioxide). The pre-treatment system may also include a device or system (e.g. adsorption bed) for the removal of mercury. The pre-treatment system may also include a device or system (e.g. adsorption bed) for the removal of sulfur and/or molecules containing sulfur (e.g. H2S, COS, mercaptans). The pre-treatment system may also include additional devices or systems as would be apparent to those having skill in the art.

In one or more embodiments, the pretreatment includes a system or method for separating constituents of the associated gas stream before liquefaction. For example, associated stream 22 can be subjected to cooling, partial condensation, and liquids removal (e.g. liquid knock-out) to thereby remove heavy constituents (e.g. C4, C5, C6+, benzene, toluene, ethylbenzene, xylene) of the associated gas stream. This can be advantageous since certain heavy constituents of the associated gas stream can form solids upon hydrocarbon liquefaction of stream 22 and frustrate the overall process. Systems and/or devices for the removal of hydrocarbons and other constituents of the associated gas stream that may freeze to form solids within HGL 15 may also be included within the pre-treatment system and/or as part of and/or within HGL 15 (e.g. liquid knock-out via condensation, adsorption beds).

In one or more embodiments, gaseous hydrocarbon-containing stream 22, as it is received by the heat exchanger of HGL 15, includes less than 100 volumetric parts per million (ppmv), in other embodiments less than 70 ppmv, in other embodiments less than 50 ppmv, in other embodiments less than 40 ppmv, and in other embodiments less than 20 ppmv carbon dioxide.

As suggested above, HGL facility 15 is in proximity to hydrocarbon well 13. The benefits of being in proximity to well 13 will be apparent to those having skill in the art since gaseous hydrocarbons can present challenges or require infrastructure (e.g. pipelines) for transfer. In one or more embodiments, HGL facility 15 receives gaseous hydrocarbon-containing stream 22 from well 13, which is situated within 10 miles, in other embodiments within 5 miles, in other embodiments within one mile, in other embodiments within 0.5 mile, and in other embodiments within 0.1 mile (i.e. 500 feet) of HGL facility 15.

In one or more embodiments, HGL facility 15 is a mobile platform facility that is adapted for transport and assembly between various hydrocarbon production wells. For example, HGL facility 15 may be supported by one or more rigs, trucks, or rail cars. In particular embodiments, HGL facility 15 is a single skid facility that can be transported by a single vehicle.

Air Separation Unit & Nitrogen Liquefaction Facility

Practice of one or more embodiments of the invention is not necessarily limited by the type of air separation unit (e.g. ASU 17) included within the system. As generally understood, air separation units intake atmospheric air and separate the air into its constituent components with the goal of providing purified streams of at least one of nitrogen, oxygen, and argon. In one or more embodiments, the air separation unit employs a cryogenic air separation technique, which may also be referred to as cryogenic air distillation. According to these systems and techniques, atmospheric air is liquefied by cooling, optionally in combination with changes in pressure to form a liquid air mixture, and then the various constituents can be separated by distillation, which takes advantage of the varying boiling points of the component constituents.

In one or more embodiments, the air separation technique may include a filtration process to remove contaminants from the air. The air stream is then compressed, typically to about 5 to about 10 bar gauge. Water and carbon dioxide are removed from the air stream using various techniques including molecular sieves and/or condensation techniques. The pressurized air stream is then passed through a heat exchanger or multiple heat exchangers against a cryogenic fluid stream or multiple cryogenic fluid streams, which may include cryogenic streams resulting from the process of this invention (e.g. liquified hydrocarbon stream 24). Heat is transferred from the pressurized air stream to the cryogenic stream(s) to thereby cool and/or at least partially liquefy the compressed air stream for separation into a nitrogen-rich stream and an oxygen-rich stream. The separation of the compressed air stream into a nitrogen-rich stream and an oxygen-rich stream is accomplished by distillation, typically using multiple distillation columns which are typically operated at multiple pressures. This refrigeration cycle is typically operated within an insulated enclosure, which may be referred to as a cold box.

In one or more embodiments, ASU 17 is adapted to produce liquid oxygen as the cryogenic liquid stream 20. In other embodiments, ASU 17 is adapted to produce liquid nitrogen as the cryogenic liquid stream 20. In yet other embodiments, ASU 17 is adapted to produce liquid air as the cryogenic liquid stream 20; in other words, atmospheric air is liquefied with limited separation or without appreciable separation of the respective constituents.

In one or more embodiments, ASU 17 is adapted to produce liquid oxygen and gaseous nitrogen. In these embodiments, the liquid oxygen produced by the air separation process is primarily employed to supplement the cooling requirements within ASU 17 (e.g. resulting in gaseous oxygen effluent from ASU 17). The production of gaseous nitrogen stream from the air separation process (i.e. gaseous nitrogen stream 18) allows for extraction of any refrigeration from the nitrogen before it is then directed toward a nitrogen liquefier (e.g. nitrogen liquefaction facility 19), where the nitrogen gas is subsequently liquefied to produce cryogenic liquid stream 20. Prior to delivery to N2L 19, or at N2L 19, gaseous nitrogen stream 18 can be purified. As suggested above, at least a portion of the cooling requirements of ASU 17 and/or N2L 19 is satisfied by liquefied hydrocarbon-containing stream 24.

In one or more embodiments, N2L 19 includes a compressor and heat exchanger. Generally, N2L 19 includes a system whereby gaseous nitrogen stream 18 passes against a cryogenic stream (e.g. liquefied hydrocarbon stream 24) that is heated and/or boiled within a heat exchanger, and heat from the gaseous nitrogen stream is transferred to the cryogenic stream (i.e. at least a portion is transferred to liquefied hydrocarbon stream 18) to produce a liquefied nitrogen stream. It should therefore be appreciated that at least a portion of the cooling demands of N2L 19 (or in other embodiments ASU 17) are provided by liquefied hydrocarbon stream 24. Stated another way, at least a portion of the heat required to vaporize liquefied hydrocarbon stream 24 liquid is provided from gaseous nitrogen stream 18.

Vaporization of liquefied hydrocarbon stream 24 within the heat exchanger (e.g. within N2L 19) produces a vaporized hydrocarbon stream 28. In one or more embodiments, vaporized hydrocarbon stream 28 is flared. In other embodiments, vaporized hydrocarbon stream 28 is exported (e.g. by vehicle tanker or pipeline) for use as fuel. Advantageously, fixed infrastructure can be associated with the N2L 19, which is a relatively fixed structure, which option is not readily available at well site 13 since the construction of a transport infrastructure (e.g. pipeline) within the field is not economical. In other embodiments, vaporized hydrocarbon stream 28 is used locally. For example, vaporized hydrocarbon stream 28 can be used locally for heating, reactions, power generation (e.g. via combustion, via oxy-combustion, via the Allam cycle), steam generation, transportation (e.g. compressed natural gas vehicle fuel), and conversion to liquid fuels (e.g. via Fischer-Tropsch reactions).

As suggested above, in one or more embodiments, ASU 17 and/or N2L 19 are in proximity to HGL 15 and hydrocarbon well 13. The benefits of being in proximity to HGL 15 and well 13 will be apparent to those having skill in the art since the transport of cryogenic liquids can present challenges. These challenges present themselves in the transfer or transport of cryogenic liquid 20 to HGL 15, and in the transfer or transport of liquefied hydrocarbon stream 24 to ASU 17 and/or N2L 19. The skilled person appreciates that these challenges include, but are not limited to, cost and the loss of cooling capacity as the cryogenic liquid vaporizes during transport. In one or more embodiments, ASU 17 and/or N2L 19 are within 200 miles, in other embodiments within 100 miles, in other embodiments within 50 miles, in other embodiments within 25 miles, and in other embodiments within 10 miles of HGL facility 15.

Transport

In one or more embodiments, transports 21, 25, which may be referred to as transport systems 21, 25, are adapted to maintain at least a portion of, and in certain embodiments a majority or all of the cryogenic liquid 20 in its liquid state. As those skilled in the art appreciate, this may include one or more of maintaining the liquid under pressure, providing appropriate insulation, and providing external cooling. For example, in one or more embodiments, transport 21, 25 may include insulated, vacuum-jacketed pressure vessels.

In one or more embodiments, transport 21, 25 includes a vehicle or vessel with an appropriate shipping container or tank. For example, transport may occur via truck with an appropriately equipped tanker. Similar designs can be accomplished using rail, ship, or aircraft. In other embodiments, transport 21, 25 includes a pipeline or other fixed infrastructure adapted for transporting the cryogenic liquid. In one or more embodiments, transport 21, 25 includes a combination of vehicle or vessel transport and transport via fixed infrastructure such as pipeline. Also, as stated above, transport 21 (i.e. transport for cryogenic liquid stream 20) may be a different transport from transport 25 (i.e. transport for LHG 24) or, in other embodiments, LHG stream 24 and cryogenic liquid stream 20 may be transported using common components or the same transport system.

Integration with Carbon Capture & Energy Production

In one or more embodiments, the methods and associated systems of the present invention are integrated with an energy-producing combustion process and/or carbon-dioxide capture process. As those skilled in the art appreciate, certain energy-producing combustion processes and certain carbon-dioxide capture processes operate by consuming oxygen. Oxygen for these processes can be supplied by an air separation unit that is integrated, which may include the presence of fixed infrastructure (such as conduits or pipelines) between these facilities for the transfer of liquids and gases. Integration may also include having these facilities located within proximity of each other. Also, according to one or more embodiments, the air separation unit, optionally in conjunction with a nitrogen liquefaction facility, can be integrated with an oil field and hydrocarbon gas liquefaction facility associated with that oil field as described above relative to the cryogenic liquids. In combination therewith, the energy-producing combustion processes and/or carbon-dioxide capture processes can be integrated with the hydrocarbon wells whereby the wells consume or otherwise use carbon dioxide captured from energy-producing combustion process and/or the carbon dioxide capture process. Further integration can occur by routing vaporized hydrocarbon gases from the from the air separation unit and/or nitrogen liquefaction process to the energy—producing combustion processes and/or the carbon-dioxide capture processes.

In one or more embodiments, the energy-producing combustion process includes an Allam Cycle power generation facility. As those skilled in the art appreciate, energy-producing combustion using the Allam Cycle technology employs oxygen in lieu of air for the combustion of hydrocarbons. In one or more embodiments, the carbon-dioxide capture process is a direct air carbon dioxide capture process (e.g. Direct Air Carbon Capture offered by Carbon Engineering) that includes a liquid adsorption process where alkaline solutions are used to capture carbon dioxide, which is then subsequently reacted with an alkaline earth hydroxide to form an alkaline earth carbonate. This carbonate and/or a subsequently derived carbonate is then calcined by using, for example, an oxy-combustion process to produce a concentrated carbon dioxide stream. Oxygen can be used to reduce or minimize the amount of equipment necessary to produce the concentrated carbon dioxide stream from the off gases.

The integrated methods and systems of these embodiments can be described with reference to the Figure, which shows direct air capture process 31, which may be referred to as DAC 31, and Allam Cycle power generation 33, which may be referred to as ACPG 33, integrated with ASU 17. DAC 31 and ACPG 33 receive respective oxygen streams 32, 32' from ASU 17. In one or more embodiments, streams 32, 32' include gaseous oxygen.

Advantageously, DAC 31 and ACPG 33 are in proximity to ASU 17. The benefits of being in proximity to ASU 17 will be apparent to those having skill in the art since the transport of oxygen, particularly gaseous oxygen, can present challenges. The skilled person appreciates that these challenges include, but are not limited to, cost and safety. In one or more embodiments, DAC 31 and/or ACPG 33 are within 200 miles, in other embodiments within 100 miles, in other embodiments within 50 miles, in other embodiments within 5 miles, in other embodiments within one mile of ASU 17.

As further shown, DAC 31 and/or ACPG 33 can be integrated with well 13 via carbon dioxide stream 34 and transport 35. That is, carbon dioxide stream 34, which is generated by DAC 31 and/or ACPG 33, is transferred to well 13 for at least one of sequestration, storage, or use in enhanced oil recovery. Carbon dioxide stream 34 can be transferred as a liquid carbon dioxide stream (which may require intermediary liquefaction steps) or as a gas. Transport 35 may include fixed infrastructure (e.g. pipeline) or vehicular transport. As shown, carbon dioxide stream 34 is integrated with the same well 13 that produced stream associated gas stream 22. In other embodiments, carbon dioxide stream 34 may be directed to a different well than produced associated gas stream 22 for at least one of sequestration, storage, or use in enhanced oil recovery. In one or more embodiments, vaporized hydrocarbon stream 28 can be routed to and used within DAC 31 and/or ACPG 33. In one or more embodiments, a portion of carbon dioxide stream 34 may originate from combustion of vaporized hydrocarbon stream 28, combustion of imported fuel (not shown), or other sources.

Various modifications and alterations that do not depart from the scope and spirit of this invention will become apparent to those skilled in the art. This invention is not to be duly limited to the illustrative embodiments set forth herein.

What is claimed is:

1. A method for the production of liquid hydrocarbons with reduced flaring of associated gases, the method comprising:

(i) providing a mixture of liquids and associated gases from one or more hydrocarbon wells adapted to produce liquid hydrocarbons;

(ii) separating the associated gases from the mixture of liquids and associated gases to provide gaseous hydrocarbons;

(iii) providing a cryogenic liquid from a first air separation unit or a nitrogen liquefaction facility that is associated with the first air separation unit;

(iv) transferring the cryogenic liquid to a hydrocarbon liquefaction facility;

(v) liquefying the gaseous hydrocarbons at the hydrocarbon liquefaction facility to thereby produce a liquefied hydrocarbon gas, where heat associated with the gaseous hydrocarbons is transferred to the cryogenic liquid;

(vi) transferring the liquefied hydrocarbon gas to at least one of (a) the first air separation unit or the nitrogen liquefaction facility associated with the first air separation unit, and (b) a second air separation unit or a nitrogen liquefaction facility associated with the second air separation unit, (vii) vaporizing the liquefied hydrocarbon gas at one of (a) the first air separation unit or the nitrogen liquefaction facility associated with the first air separation unit, and (b) the second air separation unit or the nitrogen liquefaction facility associated with the second air separation unit to thereby provide vaporized gaseous hydrocarbons;

(viii) providing gaseous oxygen from at least one of the first air separation unit and the second air separation unit where said vaporizing the liquified hydrocarbon gas takes place;

(ix) transferring at least a portion of the gaseous oxygen from at least one of the first air separation unit and the second air separation unit where said vaporizing the liquified hydrocarbon gas takes place to a carbon dioxide capture process; and (x) transferring at least a portion of the vaporized gaseous hydrocarbons to a combustion process, where the first air separation unit, the second air separation unit when present, the hydrocarbon well, the hydrocarbon liquefaction facility, the combustion process, and the carbon dioxide capture process are within 50 miles of each other.

2. The method of claim 1, where the cryogenic liquid is selected from the group consisting of liquid nitrogen, liquid oxygen, and liquid air.

3. The method of claim 2, where the cryogenic liquid is liquid nitrogen.

4. The method of claim 1, where said step of transferring the liquefied hydrocarbon gas includes transferring the liquefied hydrocarbon gas to the first air separation unit or the second air separation unit, or the nitrogen liquefaction facility associated with the first or second air separation unit, and further comprising at least one of cooling and liquefying air, nitrogen, and/or oxygen, at the first air separation unit or the second air separation unit to which the liquefied hydrocarbon gas is transferred to thereby produce liquid air, nitrogen, and/or oxygen, where heat associated with the air, nitrogen, and/or oxygen, is transferred to the liquefied hydrocarbon gas.

5. The method of claim 1, where the first air separation unit, the second air separation unit when present, the hydrocarbon well, the hydrocarbon liquefaction facility, the combustion process, and the carbon dioxide capture process are within 25 miles of each other.

6. The method of claim 1, where the combustion process is an Allam cycle power generation facility.

7. The method of claim 1, where said step of providing a mixture of liquids and associated gases from one or more hydrocarbon wells takes place during drilling the one or more hydrocarbon wells.

8. The method of claim 7, where the mixture of liquids and associated gases includes a mixture of drilling fluids and associated gases, and where said step of separating the associated gases takes place within a gas-mud separator.

9. The method of claim 1, where the hydrocarbon liquefaction facility is a mobile facility.

10. The method of claim 7, where said step of providing a mixture of liquids and associated gases from one or more hydrocarbon wells takes place during the production of liquid hydrocarbons from the one or more hydrocarbon wells.

11. The method of claim 10, where said production of liquid hydrocarbons includes an enhanced oil recovery process.

12. The method of claim 10, where the mixture of liquids and associated gases includes a mixture of produced liquid hydrocarbons and associated gases, and where said step of separating takes place within a gas-liquid separator.

13. The method of claim 1, where said providing a cryogenic liquid from the first air separation unit or the nitrogen liquefaction facility associated with the first air separation unit, or from the second air separation unit or the nitrogen liquefaction facility that is associated with the second air separation unit, and said step of transferring the liquified hydrocarbon gas to the first air separation unit or the nitrogen liquefaction facility associated with the first air separation unit or the second air separation unit or the nitrogen liquefaction facility that is associated with the second air separation unit includes use of the same or integrated air separation units or nitrogen liquefaction facilities that are associated the first air separation unit or the second air separation unit.

14. The method of claim 1, where the first air separation unit, the second air separation unit when present, the hydrocarbon well, the hydrocarbon liquefaction facility, the combustion process, and the carbon dioxide capture process are within 10 miles of each other.

15. The method of claim 6, where the combustion process and a carbon dioxide capture process are within 50 miles of the first air separation unit.

16. The method of claim 1, where said combustion process produces carbon dioxide, and where at least a portion of said carbon dioxide from said combustion process is transferred to said one or more hydrocarbon wells.

17. The method of claim 16, where said carbon dioxide capture process provides carbon dioxide, and where at least a portion of said carbon dioxide from said carbon dioxide capture process is transferred to said one or more hydrocarbon wells.

18. The method of claim 12, where the mixture of liquids and associated gases further includes carbon dioxide, and where the method further includes separating carbon dioxide from the associated gases within a gas-gas separator.

19. The method of claim 1, where the carbon dioxide capture process is a direct air carbon dioxide capture process.

20. The method of claim 1, where said step of transferring the cryogenic liquid to a hydrocarbon liquefaction facility takes place by truck, rail, or pipeline.

21. The method of claim 19, where the combustion process includes a calcination process associated with the direct air carbon dioxide capture process.

22. The method of claim 1, where the combustion process includes an oxy-combustion process.

23. The method of claim 1, where the combustion process provides energy to the carbon capture process.

* * * * *